United States Patent
Zhou et al.

(10) Patent No.: US 11,528,345 B2
(45) Date of Patent: Dec. 13, 2022

(54) DATA TRANSMISSION METHOD AND SYSTEM, AND APPARATUS

(71) Applicant: Huawei Technologies Co., Ltd., Shenzhen (CN)

(72) Inventors: Xingwang Zhou, Nanjing (CN); Weiguang Wang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 158 days.

(21) Appl. No.: 16/730,842

(22) Filed: Dec. 30, 2019

(65) Prior Publication Data
US 2020/0137203 A1 Apr. 30, 2020

Related U.S. Application Data

(63) Continuation of application No. PCT/CN2018/092360, filed on Jun. 22, 2018.

(30) Foreign Application Priority Data

Jun. 30, 2017 (CN) .......................... 201710524070.0

(51) Int. Cl.
*H04L 69/163* (2022.01)
*H04L 1/00* (2006.01)
(Continued)

(52) U.S. Cl.
CPC .......... *H04L 69/163* (2013.01); *H04L 1/0002* (2013.01); *H04L 1/1607* (2013.01);
(Continued)

(58) Field of Classification Search
CPC ... H04L 69/163; H04L 1/0002; H04L 1/1607; H04L 5/0055; H04L 29/08; H04L 69/321;
(Continued)

(56) References Cited

U.S. PATENT DOCUMENTS 6,947,451 B1 * 9/2005 Dommety ............. H04W 36/18
370/328
9,819,901 B1 * 11/2017 Zhu ....................... H04W 52/46
(Continued)

FOREIGN PATENT DOCUMENTS

CN 1640010 A 7/2005
CN 101588595 A 11/2009
(Continued)

OTHER PUBLICATIONS

Onoe et al., "An Efficient TCP/IP Control Scheme for Next-Generation MobileIP Communication Networks," IEICE Transactions on Communications, vol. E84-B, No. 4, pp. 863-872, XP001058875, Communications Society, Tokyo, JP (Apr. 2001).

*Primary Examiner* — Sharmin Chowdhury
(74) *Attorney, Agent, or Firm* — Leydig, Voit & Mayer, Ltd.

(57) ABSTRACT

This application provides a data transmission method and system, an apparatus, and belongs to the field of communications technologies. The method is applied to a terminal, a wireless link is established between the terminal and an access control point device, a transmission control protocol (TCP) connection is established between the terminal and a server, and the wireless link is used to bear the TCP connection. The method includes: determining, by the terminal, link state information of the wireless link by using a link layer, and sending the link state information from the link layer to a transport layer. The method also includes: sending, by the terminal to the server by using the transport layer, a link notification corresponding to the link state information. In this application, data transmission efficiency can be improved.

8 Claims, 6 Drawing Sheets

(51) Int. Cl.
*H04L 1/16* (2006.01)
*H04L 5/00* (2006.01)
*H04L 69/321* (2022.01)
*H04L 69/40* (2022.01)
*H04L 65/40* (2022.01)

(52) U.S. Cl.
CPC ............ *H04L 5/0055* (2013.01); *H04L 65/40* (2013.01); *H04L 69/321* (2013.01); *H04L 69/40* (2013.01)

(58) Field of Classification Search
CPC ....... H04L 69/40; H04L 69/16; H04L 67/141; H04L 1/0023; H04L 1/16; H04L 29/14; H04W 76/19
See application file for complete search history.

(56) References Cited

U.S. PATENT DOCUMENTS

| | | | |
|---|---|---|---|
| 2003/0023746 A1* | 1/2003 | Loguinov | H04L 47/10 709/235 |
| 2005/0170841 A1 | 8/2005 | Sagfors | |
| 2006/0059256 A1* | 3/2006 | Kakani | H04L 69/165 709/224 |
| 2006/0277298 A1 | 12/2006 | Kim et al. | |
| 2007/0213038 A1 | 9/2007 | Masseroni et al. | |
| 2008/0062926 A1* | 3/2008 | Oba | H04W 80/04 370/331 |
| 2009/0193408 A1 | 7/2009 | Ok et al. | |
| 2010/0014419 A1* | 1/2010 | Lee | H04W 80/06 370/225 |
| 2010/0293368 A1* | 11/2010 | Simon | H04Q 3/0025 713/150 |
| 2012/0209996 A1 | 8/2012 | Kitamura | |
| 2012/0213069 A1 | 8/2012 | Oguchi | |
| 2014/0304798 A1* | 10/2014 | Iyengar | H04L 63/1458 726/11 |
| 2020/0028631 A1* | 1/2020 | Hasegawa | H04L 1/1685 |

FOREIGN PATENT DOCUMENTS

| | | |
|---|---|---|
| CN | 101594268 A | 12/2009 |
| CN | 103546917 A | 1/2014 |
| CN | 106231640 A | 12/2016 |
| CN | 106376099 A | 2/2017 |
| JP | 2012175561 A | 9/2012 |
| WO | 2016115406 A1 | 7/2016 |

* cited by examiner

DATA TRANSMISSION METHOD AND SYSTEM, AND APPARATUS

CROSS-REFERENCE TO RELATED APPLICATIONS

This application is a continuation of International Application No. PCT/CN2018/092360, filed on Jun. 22, 2018, which claims priority to Chinese Patent Application No. 201710524070.0, filed on Jun. 30, 2017. The disclosures of the aforementioned applications are hereby incorporated by reference in their entireties.

TECHNICAL FIELD

This application relates to the field of communications technologies, and in particular, to a data transmission method and system, as well as an apparatus.

BACKGROUND

With development of computer technologies and network technologies, more and more intelligent terminals use a wireless technology to access a network. A manner in which the intelligent terminal uses the wireless technology to access the network is as follows. A wireless connection is established between the intelligent terminal and an access control point device (such as a router). Because the access control point device has accessed the network, after the wireless connection is established between the intelligent device and the access control point device, the intelligent device accesses the network, to transmit data to a server on a network side.

After the intelligent terminal accesses the network by using the wireless technology, when a data packet is transmitted between the server (hereinafter referred to as a transmit end) and the intelligent terminal (hereinafter referred to as a receive end), a transmission control protocol (TCP) is generally used to transmit data between the transmit end and the receive end, to ensure that the receive end can reliably receive a data packet sent by the transmit end. The TCP is a reliable, connection-oriented, and byte-stream transport layer communications protocol. Before transmitting data by using the TCP, the transmit end and the receive end need to establish a TCP connection by using a three-way handshake. In addition, when data is transmitted by using the TCP, after receiving a data packet, the receive end feeds back an acknowledgement (ACK) packet to the transmit end. If the transmit end determines that the receive end does not feedback an ACK packet corresponding to a data packet, the transmit end retransmits the data packet. In this way, the receive end can reliably receive the data packet.

The transmit end only transmits the data packet to the receive end, and receives the ACK packet fed back from the receive end. The transmit end does not know a link state between the receive end and the access control point device. In this way, when the transmit end transmits a data packet to the receive end, the data packet might not be transmitted based on the link state between the receive end and the access control point device, thereby causing relatively low data packet transmission efficiency.

SUMMARY

To resolve the problem in the prior art, embodiments of the present disclosure provide a data transmission method and system, and an apparatus. The technical solutions are as follows.

According to a first aspect, a data transmission method is provided, where the method is applied to a terminal, a wireless link is established between the terminal and an access control point device, a transmission control protocol TCP connection is established between the terminal and a server, the wireless link is used to bear the TCP connection, and the method includes: determining, by the terminal, link state information of the wireless link by using a link layer, and sending the link state information from the link layer to a transport layer; and sending, by the terminal to the server by using the transport layer, a link notification corresponding to the link state information.

In the solution provided in this embodiment of the present disclosure, the wireless link is established between the terminal and the access control point device, the TCP connection is established between the terminal and the server, the wireless link is used to bear the TCP connection, and the terminal may determine the link state information of the wireless link by using the link layer, and then send the link state information to the transport layer. The terminal may determine the corresponding link notification based on the link state information of the wireless link, and then send the link notification to the server.

In a possible implementation, when detecting, by using the link layer, that the wireless link is reconnected after being disconnected, the terminal sends, to the transport layer, link state information used to indicate that the wireless link is reconnected.

In the solution provided in this embodiment of the present disclosure, after the wireless link is established between the access control point device and the terminal, the access control point device periodically sends a detection packet to the terminal, where the detection packet is used by the terminal to determine whether the wireless link is connected. If the terminal does not receive, for a consecutive period of time, the detection packet sent by the access control point device, the terminal determines that the wireless link is disconnected. When receiving the detection packet sent by the access control point device again, the terminal determines that the wireless link is reconnected after being disconnected. In this case, the terminal may send, to the transport layer, the link state information used to indicate that the wireless link is reconnected.

In a possible implementation, if duration between a current time point and a time point at which the terminal receives, for the last time by using the transport layer, the data packet sent by the server exceeds a preset duration threshold, the terminal sends, to the server by using the transport layer, the link notification corresponding to the link state information.

The preset duration threshold, for example, 200 ms, may be preset by a person skilled in the art, and stored in the terminal. The preset duration threshold may be generally equal to duration in which the server determines that a data packet fails to be transmitted. For example, when the server does not receive, within 200 ms after transmitting a data packet to the terminal, an ACK packet fed back from the terminal, the server determines that the data fails to be transmitted, and the preset duration threshold may be 200 ms. Transmitting a data packet herein is transmitting the data packet for the first time instead of retransmitting the data packet.

In the solution provided in this embodiment of the present disclosure, after receiving, at the transport layer, the link state information sent from the link layer, the terminal may determine a time point at which the terminal receives, for the last time by using the transport layer, the data packet sent by the server. If the duration between the time point and the current time point exceeds the preset duration threshold, the terminal may determine the link notification corresponding to the link state information, and then send the link notification to the server by using the transport layer, where the link notification is used to notify the server that the wireless link is reconnected.

In a possible implementation, the link notification is an ACK packet, and an acknowledgement number of the ACK packet is a sequence number of a data packet that the terminal expects to receive from the server.

In the solution provided in this embodiment of the present disclosure, the link notification is the ACK packet, the acknowledgement number of the ACK packet is the sequence number of the data packet that the terminal expects to receive from the server. It may be understood in two cases described herein. If sequence numbers of data packets received by the terminal from the server are consecutive, the sequence number of the data packet that the terminal expects to receive from the server is a sequence number of a data packet following the data packet finally received by the terminal from the server; or if sequence numbers of data packets received by the terminal from the server are not consecutive, the sequence number of the data packet that the terminal expects to receive from the server is the missing sequence number. For example, in the foregoing two cases, the first case is: sequence numbers of data packets received by the terminal is 1, 2, and 3, and the terminal expects to receive a data packet having a sequence number of 4, so that the acknowledgement number of the ACK packet is 4; in the second case, sequence numbers of data packets received by the terminal is 1, 2, 3, 5, and 6, the terminal does not receive the data packet having a sequence number of 4, and the terminal expects to receive the data packet having a sequence number of 4, so that the acknowledgement number of the ACK packet is 4. In this way, after receiving the ACK packet, the server may send, to the terminal, a data packet having a sequence number equal to the acknowledgement number of the ACK packet.

In a possible implementation, the terminal sends, to the server based on a preset period by using the transport layer, the link notification corresponding to the link state information.

The preset period may be preset by a person skilled in the art, and stored in the terminal.

In a possible implementation, the link state information includes one or more types of a signal level, link quality, and a link bit rate.

In a possible implementation, the terminal receives a detection packet periodically sent by the access control point device; and the terminal determines, by using the link layer, the link state information based on signal strength of receiving the detection packet.

In the solution provided in this embodiment of the present disclosure, the access control point device may send the detection packet to the terminal at an interval of a preset period. The terminal may determine the link state information by using the link layer based on the signal strength of a signal used for receiving the detection packet. For example, the terminal may pre-store a correspondence between a range of signal strength of receiving the detection packet and each of a signal level, link quality, and a link bit rate. The terminal may determine the signal strength of a signal used for receiving the detection packet, and then determine a signal strength range to which the signal strength belongs, to further determine the signal level, the link quality, and the link bit rate based on the foregoing correspondence. Alternatively, the terminal may determine the signal level, the link quality, and the link bit rate by using a corresponding relational expression based on the signal strength of a signal used for receiving the detection packet.

In a possible implementation, the terminal sends, to the server by using the transport layer, the link notification that is corresponding to the link state information and that is carried in an extension field of an ACK packet.

In the solution provided in this embodiment of the present disclosure, an extension field is set in the ACK packet, and the link notification corresponding to the link state information is carried in the extension field.

In a possible implementation, the terminal sends, to the server by using the transport layer, the link notification that is corresponding to the link state information and that is carried in an out-of-band message.

The out-of-band message may be an SMS message, a message in a connection other than a TCP connection, a message in another network, or the like.

According to a second aspect, a data transmission method is provided, where the method is applied to a server, a transmission control protocol TCP connection is established between the server and a terminal, a wireless link is established between the terminal and an access control point device, the wireless link is used to bear the TCP connection, and the method includes:

receiving, by the server by using a transport layer, a link notification that is corresponding to the link state information and that is sent by the terminal; and performing, by the server, data transmission management on the TCP connection based on the link notification.

In the solution provided in this embodiment of the present disclosure, after receiving, by using the transport layer, the link notification that is corresponding to the link state information and that is sent by the terminal, the server may perform, based on the link notification, data transmission management on the TCP established with the terminal, for example, adjust a data transmission speed, and retransmit a to-be-retransmitted data packet.

In a possible implementation, the link notification is used to notify the server that the wireless link is reconnected; and the server obtains a to-be-retransmitted data packet corresponding to the terminal, and sends the to-be-retransmitted data packet to the terminal.

In the solution provided in this embodiment of the present disclosure, if the link notification is used to notify the server that the wireless link is reconnected, the server obtains the to-be-retransmitted data packet corresponding to the terminal, and then immediately sends the to-be-retransmitted data packet to the terminal. In this way, the server can transmit the data packet to the terminal in a timely manner, thereby improving data transmission efficiency.

In a possible implementation, the link state information includes one or more types of a signal level, link quality, and a link bit rate; and the server adjusts, based on the link notification, a transmission rate for transmitting data to the terminal.

In the solution provided in this embodiment of the present disclosure, after receiving the link notification, the server may further obtain, through parsing, the signal level, the link quality, and the link bit rate that are carried in the link notification. The server may pre-store a first weighted value corresponding to the signal level, a second weighted value corresponding to the link quality, and a third weighted value corresponding to the link bit rate. The server may multiply the signal level obtained through parsing by the first weighted value, to obtain a first product, multiply the link quality obtained through parsing by the second weighted value, to obtain a second product, multiply the link bit rate obtained through parsing by the third weighted value, to obtain a third product, and then sum up the first product, the second product, and the third product, to determine a weighted value range to which calculated weighted values belong, and then determine a transmission rate based on a pre-stored correspondence between a weighted value range and a transmission rate, thereby improving data transmission efficiency.

According to a third aspect, a terminal is provided, where the terminal includes a processor, a transmitter, and a receiver, and the processor implements, by executing an instruction, the data transmission method provided in the first aspect.

According to a fourth aspect, a server is provided, where the server includes a processor, a transmitter, and a receiver, and the processor implements, by executing an instruction, the data transmission method provided in the second aspect.

According to a fifth aspect, a terminal is provided, where the terminal includes at least one module, and the at least one module is configured to implement the data transmission method provided in the first aspect.

According to a sixth aspect, a server is provided, where the server includes at least one module, and the at least one module is configured to implement the data transmission method provided in the second aspect.

According to a seventh aspect, a computer readable storage medium is provided, and the computer readable storage medium stores an instruction. When the computer readable storage medium runs on a terminal, the terminal performs the data transmission method provided in the first aspect.

According to an eighth aspect, a computer readable storage medium is provided, and the computer readable storage medium stores an instruction. When the computer readable storage medium runs on a server, the server performs the data transmission method provided in the second aspect.

According to a ninth aspect, a computer program product including an instruction is provided, and when the computer program product runs on a terminal, the terminal performs the data transmission method provided in the first aspect.

According to a tenth aspect, a computer program product including an instruction is provided, and when the computer program product runs on a server, the server performs the data transmission method provided in the second aspect.

According to an eleventh aspect, a data transmission system is provided, where the system includes a terminal, for example, the terminal according to the third aspect, and a server, for example, the server according to the fourth aspect.

The technical solutions provided in the embodiments of the present disclosure bring the following beneficial effects.

In the embodiments of the present disclosure, the terminal determines the link state information of the wireless link by using the link layer, and sends the link state information from the link layer to the transport layer. The terminal sends, to the server by using the transport layer, the link notification corresponding to the link state information. The server may perform data transmission management on the TCP connection based on the link notification. In this way, because the terminal sends, to the server, the link notification corresponding to the link state information, the server may obtain the link state information of the wireless link between the terminal and the access control point device, so that data transmission management can be performed on the TCP connection in a timely manner, thereby improving data transmission efficiency.

DESCRIPTION OF EMBODIMENTS

To make the objectives, technical solutions, and advantages of this application clearer, the following further describes the implementations of this application in detail with reference to the accompanying drawings.

To facilitate understanding of the embodiments of the present disclosure, the following describes a system architecture and concepts of terms used in the embodiments of the present disclosure.

Figure 1:
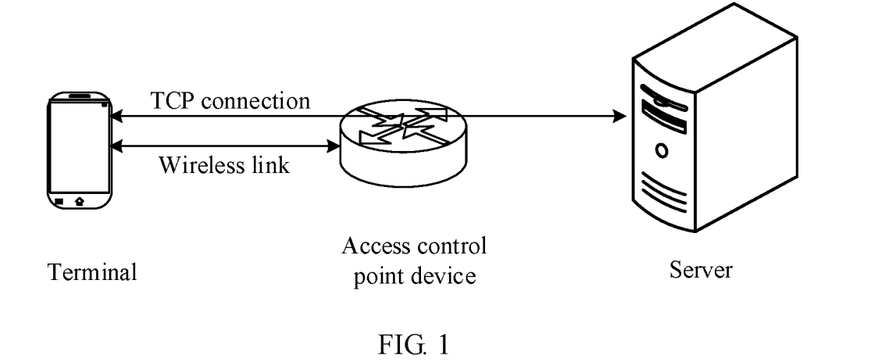
FIG. 1 is a schematic diagram of a system architecture for data transmission according to an embodiment.

The embodiments of the present disclosure are applicable to a data transmission system. As shown in FIG. 1, the data transmission system includes a terminal, an access control point device, and a server. The terminal may be a device such as a mobile phone or a computer that can access a wireless network. The access control point device may be a wireless router or the like. The server may be any server that transmits a data packet to the terminal. A wireless link is established between the terminal and the access control point device, and a wired link is established between the access control point device and the server. When a data packet is transmitted between the terminal and the server, a TCP connection may be established by using a TCP three-way handshake. The TCP connection may be established between the terminal and one or more servers.

An embodiment of the present disclosure provides a data transmission method. The method may be performed by a terminal and a server.

Figure 2:
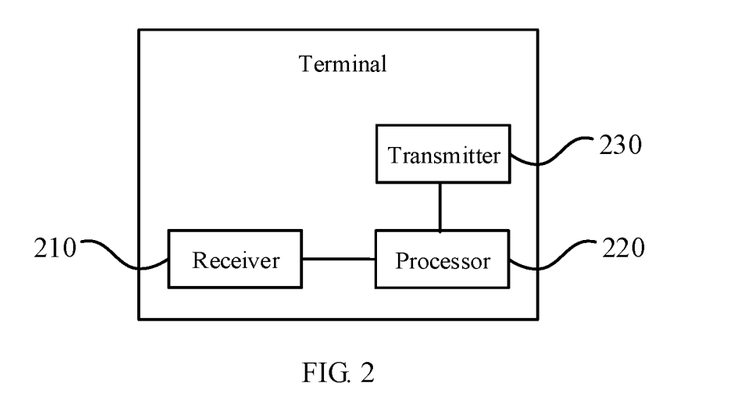
FIG. 2 is a schematic structural diagram of a terminal according to an embodiment.

As shown in FIG. 2, the terminal may include a receiver 210, a processor 220, and a transmitter 230, where the receiver 210 may be configured to receive a data packet sent by a server, the transmitter 230 may be configured to send data and a message, and the processor 220 performs various functional applications and data processing by running a software program and a module.

The processor 220 is a control center of the terminal, is connected to all parts of the entire terminal by using various interfaces and lines, and performs various functional applications and data processing by running a software program and a module, so as to perform overall monitoring on the terminal. Optionally, the processor 220 may include one or more processing units, and the processing unit may be a central processing unit (CPU), a network processor (NP), or the like.

Figure 3:
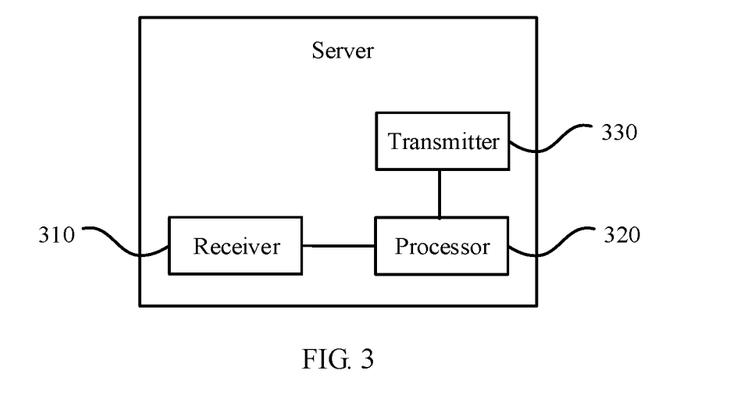
FIG. 3 is a schematic structural diagram of a server according to an embodiment.

As shown in FIG. 3, the server may include a receiver 310, a processor 320, and a transmitter 330, where the receiver 310 may be configured to receive data and a message, the transmitter 330 may be configured to send data and a message, and the processor 320 performs various functional applications and data processing by running a software program and a module.

The processor 320 is a control center of the server, is connected to all parts of the entire server by using various interfaces and lines, and performs various functional applications and data processing by running a software program and a module, so as to perform overall monitoring on the server. Optionally, the processor 320 may include one or more processing units, and each processing unit may be a central processing unit, a network processor, or the like.

Figure 4:
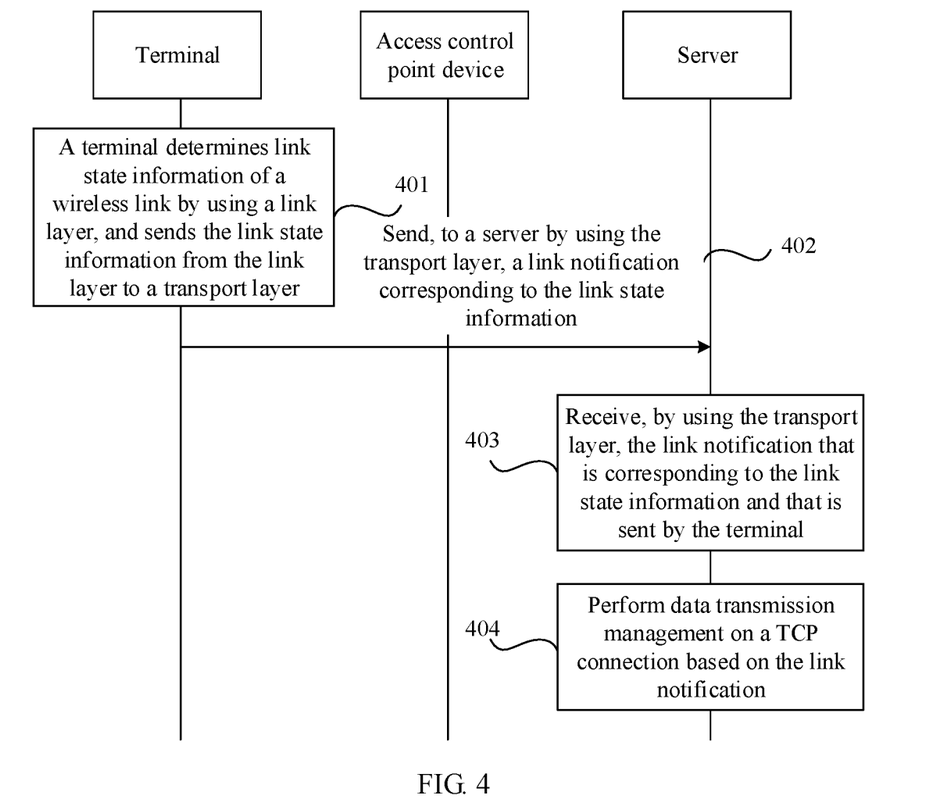
FIG. 4 is a schematic flowchart of data transmission according to an embodiment.

As shown in FIG. 4, an embodiment of the present disclosure provides a data transmission method. A processing procedure of the method may include the following steps.

Step 401: A terminal determines link state information of a wireless link by using a link layer, and sends the link state information from the link layer to a transport layer.

Figure 5A:
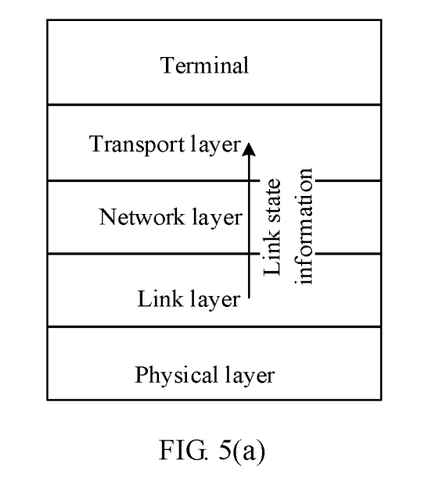
FIG. 5(a) is a schematic diagram of transmitting link state information to a transport layer by using a link layer according to an embodiment.

In implementation, a user may enable a wireless fidelity (WIFI) function of the terminal. The terminal detects an access control point device in an environment, and then the user establishes a wireless link with the access control point device by entering a password for accessing the access control point device. Before transmitting a data packet to the server, the terminal may establish a TCP connection to the server by using a TCP three-way handshake. In a process of transmitting the data packet, the terminal may determine the link state information of the wireless link by using the link layer, and then send the link state information to the transport layer. A schematic diagram of transmission of the link state information at the terminal is shown in FIG. 5(*a*). The terminal includes a physical layer, a link layer, a network layer, and a transport layer. The terminal transmits the link state information from the network layer to the transport layer through the link layer.

It should be noted that the data packet in this embodiment of the present disclosure may be any data packet such as video data, audio data, or text data. This is not limited in this embodiment of the present disclosure.

Step 402: The terminal sends, to the server by using the transport layer, a link notification corresponding to the link state information.

In an implementation, after receiving, at the transport layer, the link state information sent from the link layer, the terminal may determine the link notification corresponding to the link state information, and then send the link notification to the server by using the transport layer.

Step 403: The server receives, by using the transport layer, the link notification that is corresponding to the link state information and that is sent by the terminal.

Step 404: The server performs data transmission management on a TCP connection based on the link notification.

In an implementation, after receiving, by using the transport layer, the link notification that is corresponding to the link state information and that is sent by the terminal, the server may perform, based on the link notification, data transmission management on the TCP connection established between the server and the terminal, for example, by adjusting a data transmission speed, and retransmit a to-be-retransmitted data packet.

Figure 6:
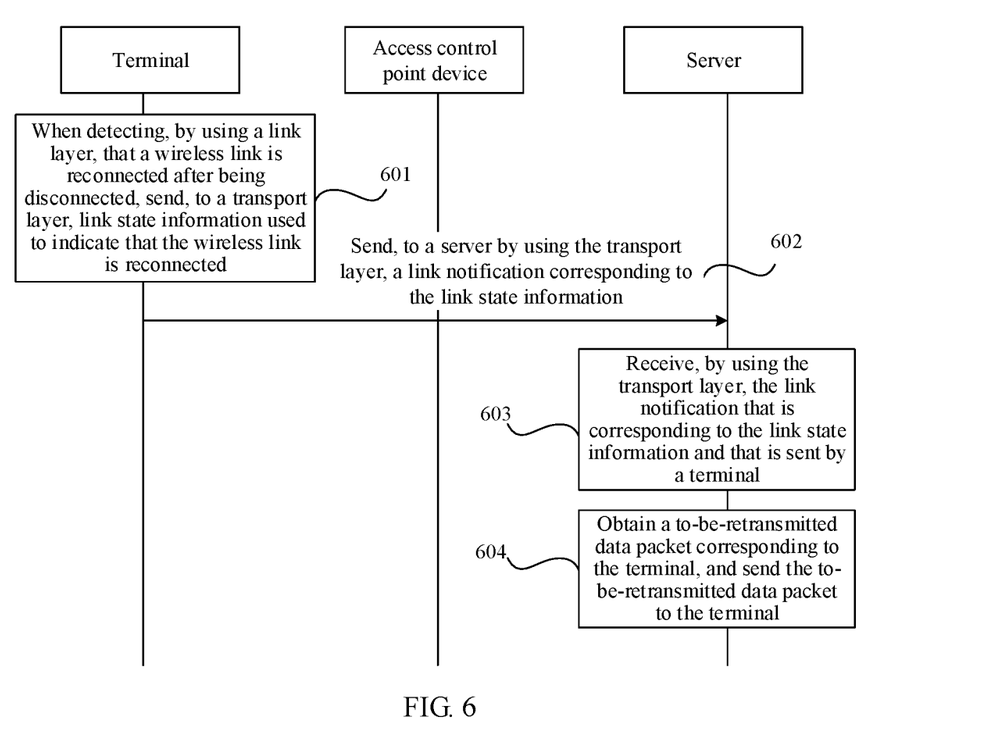
FIG. 6 is a schematic flowchart of data transmission according to an embodiment.

As shown in FIG. 6, another embodiment of the present disclosure provides a process in which a terminal sends, to a server, a link notification used to notify the server that a wireless link is reconnected. The corresponding steps of the process may be as follows.

Step 601: When detecting, by using a link layer, that the wireless link is reconnected after being disconnected, the terminal sends, to a transport layer, link state information used to indicate that the wireless link is reconnected.

Figure 5B:
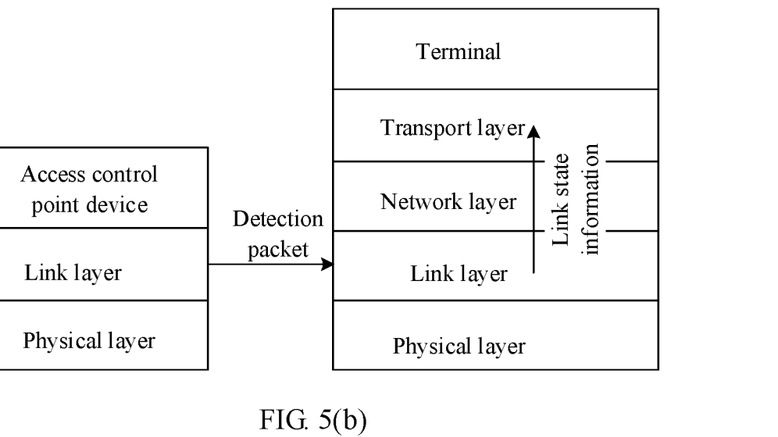
FIG. 5(b) is a schematic diagram of sending a detection packet according to an embodiment.

In an implementation, a wireless link is established between the terminal and the access control point device (for a detailed process of establishing the wireless link, refer to step 401). As shown in FIG. 5(*b*), the access control point device may send a detection packet to the terminal at an interval of a preset period by using a link layer of the access control point device. The terminal may receive the detection packet by using the link layer, and then determine, based on a status of receiving the detection packet, whether the wireless link is connected. If duration between a current time point and a time point at which the terminal receives, for the last time, the detection packet sent by the access control point device exceeds a specific value, or the terminal does not receive the detection packet sent by the access control point device in N (N is a preset positive integer) consecutive preset periods, the terminal may determine that the wireless link is disconnected. When determining, by using the link layer, that the detection packet is received again, the terminal may determine that the wireless link is reconnected after being disconnected, and the terminal may send, to the transport layer, the link state information used to indicate that the wireless link is reconnected.

Optionally, the detection packet may be a beacon frame or another packet. This is not limited in this embodiment of the present disclosure.

It should be noted that the preset period (e.g., 10 ms) may be preset by a person skilled in the art, and stored in the terminal.

Optionally, the link state information may further include one or more types of a signal level, link quality, and a link bit rate.

In an implementation, the access control point device may send the detection packet to the terminal at an interval of the preset period. The terminal may determine, by using the link layer, the link state information based on a signal strength of a signal used for receiving the detection packet. For example, the terminal may pre-store a correspondence between a range of signal strength of receiving the detection packet and each of a signal level, link quality, and a link bit rate. The terminal may determine the signal strength of receiving the detection packet, and then determine a signal strength range to which the signal strength belongs, to further determine the signal level, the link quality, and the link bit rate based on the foregoing correspondence. Alternatively, the terminal may determine the signal level, the link quality, and the link bit rate by using a corresponding relational expression based on the signal strength of receiving the detection packet.

Step 602: The terminal sends, to the server by using the transport layer, a link notification corresponding to the link state information.

In an implementation, after the terminal receives, at the transport layer, the link state information sent from the link layer, because the link state information is used to indicate that the wireless link is reconnected, the terminal may determine the link notification corresponding to the link state information as a notification used to notify the server that the wireless link is reconnected, and then send the link notification to the server by using the transport layer.

It should be noted that, in step 601, the link state information further includes one or more types of a signal level, link quality, and a link bit rate. Correspondingly, the link notification sent in step 602 also carries corresponding link state information.

Optionally, before sending the link notification to the server by using the transport layer, the terminal further determines whether a duration between a current time point and a time point at which the terminal receives, for the last time, a data packet sent by the server exceeds a preset duration threshold. Correspondingly, processing in step 602 may be as follows.

If the duration between the current time point and the time point at which the terminal receives, for the last time by using the transport layer, the data packet sent by the server exceeds the preset duration threshold, the terminal sends, to the server by using the transport layer, the link notification corresponding to the link state information.

The preset duration threshold (e.g., 200 ms) may be preset by a person skilled in the art, and stored in the terminal. The preset duration threshold may be generally equal to duration in which the server determines that a data packet fails to be transmitted. For example, when the server does not receive, within 200 ms after transmitting a data packet to the terminal, an ACK packet fed back from the terminal, the server determines that the data fails to be transmitted, and the preset duration threshold may be 200 ms. Transmitting a data packet herein is transmitting the data packet for the first time instead of retransmitting the data packet.

In an implementation, after receiving, at the transport layer, the link state information sent from the link layer, the terminal may determine the time point at which the terminal receives, for the last time by using the transport layer, the data packet sent by the server, and then calculate duration between the time point and the current time point. If the duration between the time point and the current time point exceeds the preset duration threshold, the terminal may determine the link notification corresponding to the link state information, and then send the link notification to the server by using the transport layer, where the link notification is used to notify the server that the wireless link is reconnected. For example, the preset duration threshold is 200 ms, the time point at which the terminal receives, for the last time, the data packet sent by the server is 10:20:30, and the current time point is 10:20:31. In this case, the duration between the current time point and the time point at which the terminal receives, for the last time, the data packet sent by the server is 1 s, which is greater than the preset duration threshold, and the terminal may send, to the server by using the transport layer, the link notification corresponding to the link state information.

Optionally, there are a plurality of methods for sending, by the terminal to the server by using the link layer, the link notification corresponding to the link state information. The following provides three feasible manners for sending the link notification.

Manner 1: The link notification is an ACK packet.

An acknowledgement number of the ACK packet is a sequence number of a data packet that the terminal expects to receive from the server. It may be understood in two cases described herein. If sequence numbers of data packets received by the terminal from the server are consecutive, the sequence number of the data packet that the terminal expects to receive from the server is a sequence number of a data packet following the data packet finally received by the terminal from the server; or if sequence numbers of data packets received by the terminal from the server are not consecutive, the sequence number of the data packet that the terminal expects to receive from the server is the missing sequence number. For example, in the foregoing two cases, the first case is: sequence numbers of data packets received by the terminal is 1, 2, and 3, the terminal has received a data packet having a sequence number of 3, and expects to receive a data packet having a sequence number of 4, so that the acknowledgement number of the ACK packet is 4; in the second case, sequence numbers of data packets received by the terminal is 1, 2, 3, 5, and 6, the terminal does not receive the data packet having a sequence number of 4, and expects to receive a data packet having a sequence number of 4, so that the acknowledgement number of the ACK packet is 4.

In an implementation, in the prior art, after receiving a data packet sent by the server, the terminal feeds back an ACK packet to the server, and an acknowledgement number of the ACK packet is a sequence number of a data packet that the terminal expects to receive. After receiving the ACK packet sent by the terminal, the server sends, to the terminal, a data packet having a sequence number equal to the acknowledgement number of the ACK packet. For example, the terminal receives a data packet that has a sequence number of 100 and that is sent by the server, and sends, to the server, an ACK packet having an acknowledgement number of 101, and the server sends a data packet having a sequence number of 101 to the terminal.

Herein, link notification is the ACK packet, and the acknowledgement number of the ACK packet is a sequence number of a data packet that the terminal expects to receive from the server. In this way, after failing to transmit a data packet, the server receives the ACK packet. The server determines that a link between the terminal and the access control point device is reconnected, and may send, to the terminal, a data packet having a sequence number equal to the acknowledgement number of the ACK packet.

It should be noted that, generally, the terminal sends the ACK packet to the server after receiving the data packet. In this embodiment of the present disclosure, after the wireless link is reconnected after being disconnected, the terminal sends the ACK packet to the server, so that the server retransmits the to-be-retransmitted data packet.

Manner 2: The terminal sends, to the server by using the transport layer, the link notification that is corresponding to the link state information and that is carried in an extension field of an ACK packet.

In an implementation, an extension field is set in the ACK packet, and the link notification corresponding to the link state information is carried in the extension field. In other words, the terminal may send, to the server by using the transport layer, the link notification that is corresponding to the link state information and that is carried in the extension field of the ACK packet.

For example, the extension field of the ACK packet is "other options", the link notification is Resumed, and a carrying manner may be as follows:

TCP Options:
. . . // other options
Link State: Resumed.

Manner 3: The terminal sends, to the server by using the transport layer, the link notification that is corresponding to the link state information and that is carried in an out-of-band message.

The out-of-band message may be an SMS message, a message transmitted in a connection other than a TCP connection, a message transmitted in another network, or the like.

In implementation, after determining the link notification, the terminal may further send, to the server by using the transport layer, the link notification that is corresponding to the link state information and that is carried in the out-of-band message.

Step 603: The server receives, by using the transport layer, the link notification that is corresponding to the link state information and that is sent by the terminal.

Step 604: The server obtains a to-be-retransmitted data packet corresponding to the terminal, and sends the to-be-retransmitted data packet to the terminal.

In an implementation, after the server receives the link notification that is sent by the terminal and that is corresponding to the link state information, if the link notification is used to notify the server that the wireless link is reconnected, the server may obtain a data packet that fails to be transmitted, namely, the to-be-retransmitted data packet, and then send the to-be-retransmitted data packet to the terminal.

Optionally, if the link notification carries one or more types of the signal level, the link quality, and the link bit rate, after the server receives the link notification, the server may further obtain, through parsing, the signal level, the link quality, or the link bit rate that are carried in the link notification. A first weighted value corresponding to the signal level, a second weighted value corresponding to the link quality, and a third weighted value corresponding to the link bit rate may be pre-stored in the server. The server may multiply the signal level obtained through parsing by the first weighted value, to obtain a first product, multiply the link quality obtained through parsing by the second weighted value, to obtain a second product, multiply the link bit rate obtained through parsing by the third weighted value, to obtain a third product, and then sum up the first product, the second product, and the third product, to determine a weighted value range to which calculated weighted values belong, and then determine a transmission rate based on a pre-stored correspondence between a weighted value range and a transmission rate. If the determined transmission rate is reduced, a data amount corresponding to each transmitted data packet may be reduced; or if the determined transmission rate is increased, a data amount corresponding to each transmitted data packet may be increased.

It should be noted that the first weighted value, the second weighted value, and the third weighted value may be preset by a person skilled in the art, and stored in the server. A sum of the first weighted value, the second weighted value, and the third weighted value is 1. For example, the first weighted value is 0.3, the second weighted value is 0.4, and the third weighted value is 0.4.

In the prior art, if the server does not receive, within duration of $2^n T$ after sending a data packet to the terminal, an ACK packet corresponding to the data packet (n is a quantity of retransmission times, and is greater than or equal to 0, and $2^n T$ is retransmission waiting time), the server may retransmit the data packet to the terminal, and the server does not send the data packet to the terminal until the server receives the ACK packet that is corresponding to the data packet and that is sent by the terminal or a maximum quantity of retransmission times is reached. Because there is a wireless link between the terminal and the access control point device, the link between the terminal and the access control point device is easily interfered by a signal of an interference source (such as a microwave oven), and transient link disconnection occurs. In the foregoing retransmission manner, when the wireless link between the terminal and the access control point device is quickly reconnected after being disconnected, if the retransmission waiting time is not reached, the server needs to wait for a period of time before retransmission, thereby causing relatively low data transmission efficiency. In this embodiment of the present disclosure, when the terminal detects that the wireless link is reconnected after being disconnected, the terminal sends a link notification to the server in a timely manner, to notify the server that the data packet can be retransmitted instead of waiting until the retransmission waiting time is reached, so that the data packet can be transmitted in a timely manner, thereby improving data transmission efficiency.

Figure 7:
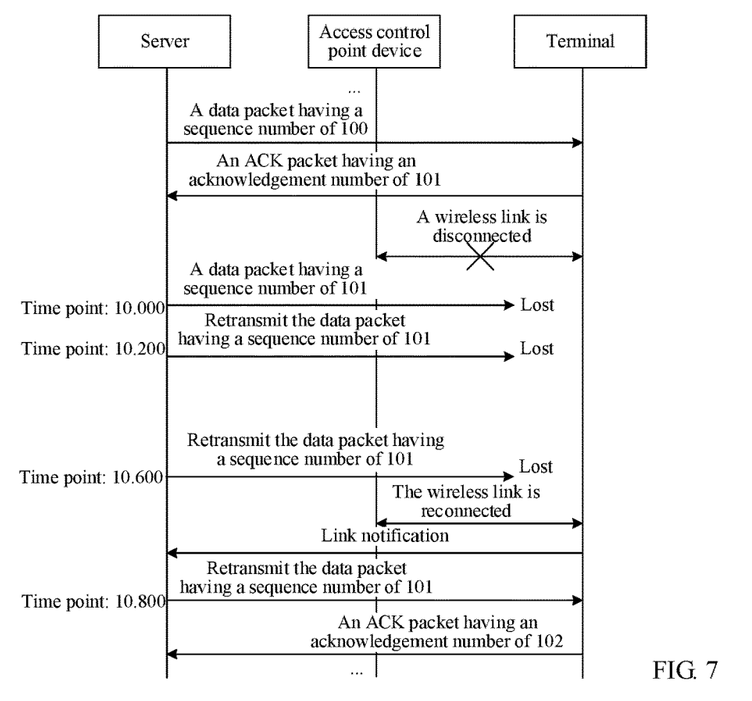
FIG. 7 is a schematic flowchart of data transmission according to an embodiment.

For example, as shown in FIG. 7, T is 200 ms. After the terminal receives the data packet that has a sequence number of 100 and that is sent by the server, the terminal sends an ACK packet having an acknowledgement number of 101 to the server. Subsequently, the wireless link between the terminal and the access control point device is disconnected, and the data packet that has a sequence number of 101 and that is sent by the server to the terminal is lost. The server sends the data packet having a sequence number of 101 to the terminal at a time point 10.000. When the server does not receive the ACK packet that has a sequence number of 101 and that is sent by the terminal at a time point 10.200, the server may retransmit the data packet having a sequence number of 101 to the terminal. When the server does not receive the ACK packet that has an acknowledgement number of 101 and that is sent by the terminal at a time point 10.600, the server may retransmit the data packet having a sequence number of 101 to the terminal. The terminal determines, before a time point 10.800, that the wireless link is restored. Although the link between the terminal and the access control point device is reconnected, the server may retransmit the data packet having a sequence number of 101 to the terminal only when not receiving, at a time point 11.400, the ACK packet that has an acknowledgement number of 101 and that is sent by the terminal. It can be learned that in the prior art, the data packet having a sequence number of 101 can be retransmitted to the terminal only at the time point 11.400. In the manner of this embodiment of the present disclosure, when determining, before the time point 10.800, that the wireless link is restored, the terminal may send a link notification to the server. After receiving the link notification, the server determines that the wireless link between the terminal and the access control point device is reconnected, and may retransmit the data packet having a sequence number of 101 to the terminal. In this way, at the time point 10.800, the server may retransmit the data packet having a sequence number of 101 to the terminal. After receiving the data packet having a sequence number of 101, the terminal sends, to the server, an ACK packet having an acknowledgement number of 102. Compared with that in the prior art, the to-be-retransmitted data packet can be transmitted to the terminal as early as possible, thereby improving data transmission efficiency.

Figure 8:
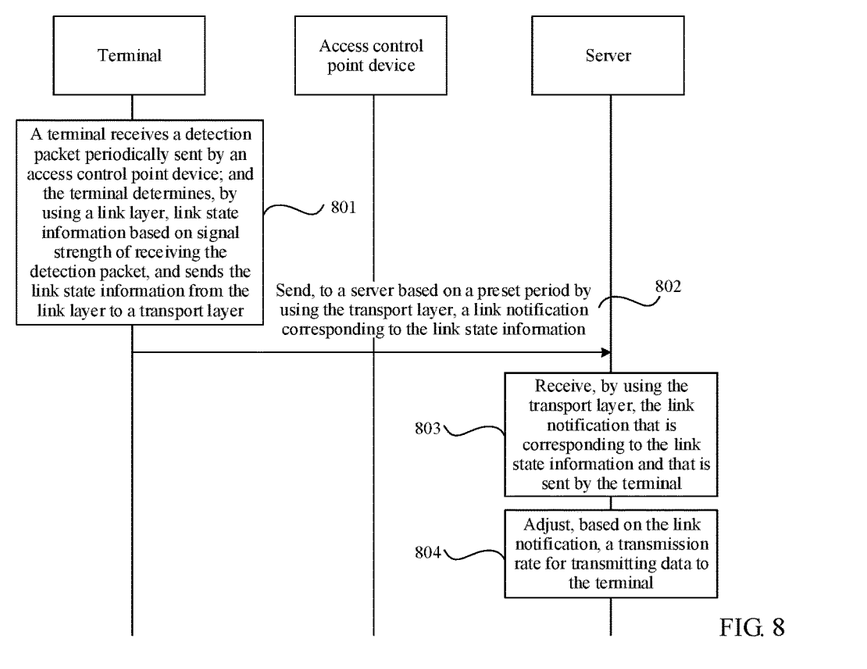
FIG. 8 is a schematic flowchart of data transmission according to an embodiment.

As shown in FIG. 8, another embodiment of the present disclosure provides a method for carrying link state information in a link notification. The corresponding steps of the method may be as follows.

Step 801: A terminal receives a detection packet periodically sent by an access control point device; and the terminal determines, by using a link layer, the link state information based on signal strength of receiving the detection packet, and sends the link state information from the link layer to a transport layer.

The link state information includes one or more types of a signal level, link quality, and a link bit rate. The detection packet may be a Beacon frame or another packet. This is not limited in this embodiment of the present disclosure. A period for sending the detection packet by the access control point device may be a preset period (e.g., 10 ms) and may be preset by a person skilled in the art, and stored in the terminal.

In an implementation, a wireless link is established between the terminal and the access control point device (for a detailed process of establishing the wireless link, refer to step 401). As shown in FIG. 5(b), the access control point device may send a detection packet to the terminal at an interval of a preset period by using the link layer. The terminal may receive the detection packet by using the link layer, and determine the link state information of the wireless link by using the link layer based on the signal strength of a signal used for receiving the detection packet. For example, the terminal may pre-store a correspondence between a range of signal strength of receiving the detection packet and each of a signal level, link quality, and a link bit rate, and the terminal may determine the signal strength of receiving the detection packet, and then determine a signal strength range to which the signal strength belongs, and further determine the signal level, the link quality, and the link bit rate based on the foregoing correspondence. Alternatively, the terminal may determine the signal level, the link quality, and the link bit rate by using a corresponding relational expression based on the signal strength of receiving the detection packet.

It should be noted that the foregoing relates to only two manners for determining link state information. Any method for determining link state information based on signal strength of receiving a packet may be applied to this embodiment of the present disclosure. This is not limited in this embodiment of the present disclosure.

Step 802: The terminal sends, to a server based on a preset period by using the transport layer, a link notification corresponding to the link state information.

The preset period may be the same as or different from the period mentioned in step 801. This is not limited in this embodiment of the present disclosure.

In an implementation, after receiving, at the transport layer, the link state information sent from the link layer, the terminal may send, to the server based on the preset period by using the transport layer, the link notification corresponding to the link state information.

Optionally, there are a plurality of methods for sending, by the terminal to the server by using the link layer, the link notification corresponding to the link state information. The following provides two feasible manners for sending the link notification.

Manner 1: The terminal sends, to the server based on the preset period by using the transport layer, the link notification that is corresponding to the link state information and that is carried in an extension field of an ACK packet.

In an implementation, an extension field is set in the ACK packet, and the link notification corresponding to the link state information is carried in the extension field. In other words, the terminal may send, to the server by using the transport layer, the link notification that is corresponding to the link state information and that is carried in the extension field of the ACK packet.

For example, the extension field of the ACK packet is "other options", a signal level in the link notification is −45, link quality is 90%, and a link bit rate is 56 Mbps. A manner of carrying the link notification in the extension field of the ACK packet is as follows:

TCP Options:
. . . // other options
Link State:
Signal Level: −45
Link Quality: 90%
Bitrate: 56 Mbps.

Manner 2: The terminal sends, to the server based on the preset period by using the transport layer, the link notification that is corresponding to the link state information and that is carried in an out-of-band message.

The out-of-band message may be an SMS message, a message transmitted in a connection other than a TCP connection, a message transmitted in another network, or the like.

In an implementation, after determining the link notification, the terminal may further send, to the server based on the preset period by using the transport layer, the link notification that is corresponding to the link state information and that is carried in the out-of-band message.

In addition, the terminal may further send, to the server by using the transport layer at an interval of M ACK packets, the link notification that is corresponding to the link state information and that is carried in the out-of-band message.

The value of M (e.g., 5) may be preset by a person skilled in the art, and stored in the terminal.

In an implementation, each time the terminal receives a data packet sent by the server, the terminal sends an ACK packet to the server, to notify the server that the data packet is successfully sent. The terminal may send the link notification to the server in the foregoing manner 1 or manner 2 at an interval of 5 ACK packets.

Step 803: The server receives, by using the transport layer, the link notification that is corresponding to the link state information and that is sent by the terminal.

Step 804: The server adjusts, based on the link notification, a transmission rate for transmitting data to the terminal.

In an implementation, after receiving the link notification, the server may further obtain, through parsing, the signal level, the link quality, and the link bit rate that are carried in the link notification. The server may pre-store a first weighted value corresponding to the signal level, a second weighted value corresponding to the link quality, and a third weighted value corresponding to the link bit rate. The server may multiply the signal level obtained through parsing by the first weighted value, to obtain a first product, multiply the link quality obtained through parsing by the second weighted value, to obtain a second product, multiply the link bit rate obtained through parsing by the third weighted value, to obtain a third product, and then sum up the first product, the second product, and the third product, to determine a weighted value range to which calculated weighted values belong, and then determine a transmission rate based on a pre-stored correspondence between a weighted value range and a transmission rate.

If the determined transmission rate is reduced, a data amount corresponding to each transmitted data packet may be reduced; or if the determined transmission rate is increased, a data amount corresponding to each transmitted data packet may be increased.

It should be noted that the first weighted value, the second weighted value, and the third weighted value may be preset by a person skilled in the art, and stored in the server. A sum of the first weighted value, the second weighted value, and the third weighted value is 1. For example, the first weighted value is 0.3, the second weighted value is 0.4, and the third weighted value is 0.4.

In this embodiment of the present disclosure, the terminal determines the link state information of the wireless link by using the link layer, and sends the link state information from the link layer to the transport layer. The terminal sends, to the server by using the transport layer, the link notification corresponding to the link state information. The server may perform data transmission management on the TCP connection based on the link notification. In this way, because the terminal sends, to the server, the link notification corresponding to the link state information, the server may obtain the link state information of the wireless link between the terminal and the access control point device, so that data transmission management can be performed on the TCP connection in a timely manner, thereby improving data transmission efficiency.

Figure 9:
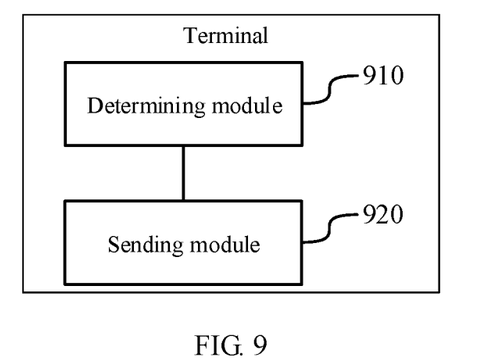
FIG. 9 is a schematic structural diagram of a terminal according to an embodiment.

FIG. 9 is a structural diagram of a terminal according to an embodiment of the present disclosure. The terminal, or parts thereof, may be implemented by using software, hardware, or a combination thereof. The terminal provided in this embodiment of the present disclosure may implement the procedures described herein and shown in FIG. 4, FIG. 6, and FIG. 8. The terminal includes a determining module 910, a sending module 920, and a receiving module 930.

The determining module 910 is configured to determine link state information of a wireless link by using a link layer.

The sending module 920 is configured to send the link state information from the link layer to a transport layer.

The sending module 920 is further configured to send, to the server by using the transport layer, a link notification corresponding to the link state information.

Optionally, the sending module 920 is configured to: when detecting, by using the link layer, that the wireless link is reconnected after being disconnected, send, to the transport layer, link state information used to indicate that the wireless link is reconnected.

Optionally, the sending module 920 is configured to: if duration between a current time point and a time point at which a data packet sent by the server is received for the last time by using the transport layer exceeds a preset duration threshold, send, to the server by using the transport layer, the link notification corresponding to the link state information.

Optionally, the link notification is an ACK packet, and an acknowledgement number of the ACK packet is a sequence number of a data packet that the terminal expects to receive from the server.

Optionally, the sending module 920 is further configured to:
send, to the server based on a preset period by using the transport layer, the link notification corresponding to the link state information.

Optionally, the link state information includes one or more types of a signal level, a link quality, and a link bit rate.

Figure 10:
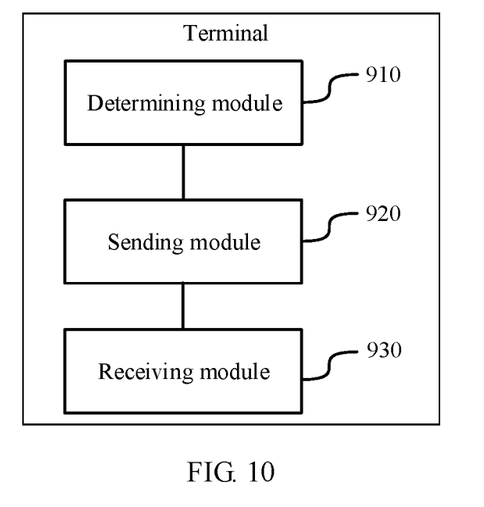
FIG. 10 is a schematic structural diagram of a terminal according to an embodiment.

Optionally, as shown in FIG. 10, the terminal further includes:
a receiving module 930, configured to receive a detection packet periodically sent by an access control point device; where
the determining module 910 is configured to determine, by using the link layer, the link state information based on signal strength of receiving the detection packet.

Optionally, the sending module 920 is further configured to:
send, to the server by using the transport layer, the link notification that is corresponding to the link state information and that is carried in an extension field of an ACK packet.

Optionally, the sending module 920 is further configured to:
send, to the server by using the transport layer, the link notification that is corresponding to the link state information and that is carried in an out-of-band message.

It should be noted that the determining module 910, the sending module 920, and the receiving module 930 may be implemented by the processor 220, or may be implemented when the processor 220 cooperates with the transmitter 230 and/or the receiver 210.

In this embodiment of the present disclosure, the terminal determines the link state information of the wireless link by using the link layer, and sends the link state information from the link layer to the transport layer. The terminal sends, to the server by using the transport layer, the link notification corresponding to the link state information. The server may perform data transmission management on a TCP connection based on the link notification. In this way, because the terminal sends, to the server, the link notification corresponding to the link state information, the server may obtain the link state information of the wireless link between the terminal and the access control point device, so that data transmission management can be performed on the TCP connection in a timely manner, thereby improving data transmission efficiency.

Figure 11:
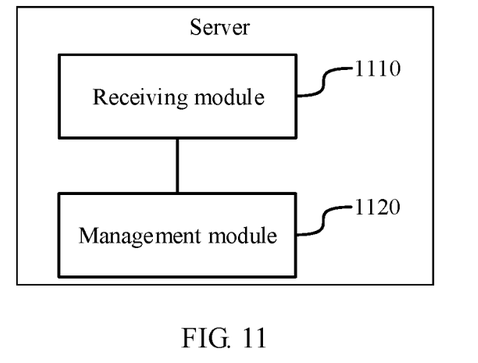
FIG. 11 is a schematic structural diagram of a server according to an embodiment.

FIG. 11 is a structural diagram of a server according to an embodiment of the present disclosure. The server may be implemented as a part or all of the server by using software, hardware, or a combination thereof. The server provided in this embodiment of the present disclosure may implement the procedures described and shown in FIG. 4, FIG. 6, and FIG. 8. The server includes a receiving module 1110 and a management module 1120.

The receiving module 1110 is configured to receive, by using a transport layer, a link notification that is corresponding to link state information and that is sent by a terminal.

The management module 1120 is configured to perform data transmission management on a TCP connection based on the link notification.

Optionally, the link notification is used to notify the server that the wireless link is reconnected.

Figure 12:
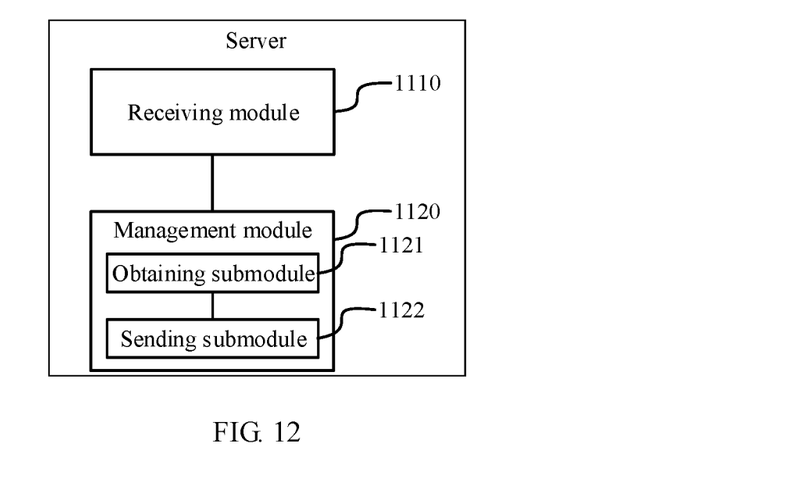
FIG. 12 is a schematic structural diagram of a server according to an embodiment.

As shown in FIG. 12, the management module 1120 includes an obtaining submodule 1121 and a sending submodule 1122.

The obtaining submodule 1121 is configured to obtain a to-be-retransmitted data packet corresponding to the terminal.

The sending submodule 1122 is configured to send the to-be-retransmitted data packet to the terminal.

Optionally, the link state information includes one or more types of a signal level, a link quality, and a link bit rate.

The management module 1120 is configured to:
adjust, based on the link notification, a transmission rate for transmitting data to the terminal.

It should be noted that the receiving module 1110 and the management module 1120 may be implemented by the processor 320, or may be implemented when the processor 320 cooperates with the transmitter 330 and/or the receiver 310.

In this embodiment of the present disclosure, the terminal determines the link state information of the wireless link by using the link layer, and sends the link state information from the link layer to the transport layer. The terminal sends, to the server by using the transport layer, the link notification corresponding to the link state information. The server may perform data transmission management on the TCP connection based on the link notification. In this way, because the terminal sends, to the server, the link notification corresponding to the link state information, the server may obtain the link state information of the wireless link between the terminal and the access control point device, so that data transmission management can be performed on the TCP connection in a timely manner, thereby improving data transmission efficiency.

All or some of the foregoing embodiments may be implemented by using software, hardware, firmware, or any combination thereof. When the software is used for implementation, the foregoing embodiments may be implemented completely or partially in a form of a computer program product. The computer program product includes one or more computer instructions, and when the computer program instructions are loaded and executed on a server or a terminal, the procedures or functions according to the embodiments of the present disclosure are all or partially generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, through a coaxial optical cable, an optical fiber, or a digital subscriber line) or wireless (for example, through infrared, radio, or microwave) manner. The computer-readable storage medium may be any usable medium accessible by a server or a terminal, or a data storage device, such as a server or a data center, including one or more usable media. The usable medium may be a magnetic medium (for example, a floppy disk, a hard disk, or a magnetic tape), an optical medium (for example, a digital video disk (Digital Video Disk, DVD), or a semiconductor medium (for example, a solid-state drive).

The foregoing description is merely an embodiment of this application, but is not intended to limit this application. Any modification, equivalent replacement, or improvement made without departing from the spirit and principle of this application should fall within the protection scope of this application.

What is claimed is:

1. A data transmission method, the method comprising:
   establishing a wireless link between a terminal and an access control point device, wherein the access control point device is configured to periodically transmit beacon frames to the terminal via the wireless link in accordance with a preset period;
   determining, by a link layer of the terminal, link state information of the wireless link, wherein the determining the link state information of the wireless link comprises:
   receiving, by the terminal, at least one beacon frame sent by the access control point device indicating that the wireless link is connected,
   determining that the wireless link is subsequently disconnected responsive to: determining that a duration between a current time and a previous time that the terminal device received the most recent beacon frame sent by the access control point exceeds a preset duration threshold, or determining that the terminal has not received a beacon frame sent by the access control point in N consecutive preset periods, where N is a positive integer,
   determining that the wireless link is subsequently reconnected after being disconnected responsive to receiving a subsequent beacon frame sent by the access control point, and
   determining, responsive to determining that the wireless link is subsequently reconnected, the link state information based on a signal strength of a signal used for receiving the beacon frame;
   sending, responsive to determining that the wireless link is subsequently reconnected, the link state information from the link layer to a transport layer; and
   sending, by the terminal to a server using the transport layer, a link notification corresponding to the link state information, wherein the link notification is carried in an extension field of an acknowledgement (ACK) packet, and wherein the extension field comprises a TCP Option included in a TCP header of the ACK packet.

2. The method according to claim 1, wherein an acknowledgement number of the ACK packet is a sequence number of a data packet that the terminal expects to receive from the server.

3. The method according to claim 1, wherein the link state information comprises one or more types of a signal level, a link quality, or a link bit rate.

4. A data transmission method, the method comprising:
   receiving, by a server using a transport layer, a link notification corresponding to link state information of a wireless link established between a terminal and an access control point device, wherein the link notification is sent to the server by the terminal via a transmission control protocol (TCP) connection established between the server and the terminal, wherein the link notification is carried in an extension field of an acknowledgement (ACK) packet, and wherein the extension field comprises a TCP Option included in a TCP header of the ACK packet; and
   performing, by the server, data transmission management on the TCP connection based on the link notification, wherein the link state information comprises a signal level, a link quality, and a link bit rate; and the performing comprises:
   adjusting, by the server based on the link notification, a transmission rate for transmitting data to the terminal based on a weighted calculation involving the signal level, the link quality, and the link bit rate.

5. The method according to claim 4, wherein the link notification notifies the server that the wireless link is reconnected; and the performing comprises:
   obtaining, by the server, a to-be-retransmitted data packet corresponding to the terminal, and
   sending the to-be-retransmitted data packet to the terminal.

6. A terminal, comprising:
   a receiver;
   a processor configured to:
   establish a wireless link between the terminal and an access control point device, wherein the access control point device is configured to periodically transmit beacon frames to the terminal via the wireless link in accordance with a preset period, determine link state information of the wireless link using a link layer by:
   receiving, at the receiver, at least one beacon frame sent by the access control point device indicating that the wireless link is connected,
   determining that the wireless link is subsequently disconnected responsive to: determining that a duration between a current time and a previous time that the terminal device received the most recent beacon frame sent by the access control point exceeds a preset duration threshold, or determining that the terminal has not received a beacon frame sent by the access control point in N consecutive preset periods, where N is a positive integer,
   determining that the wireless link is subsequently reconnected after being disconnected responsive to receiving a subsequent beacon frame sent by the access control point, and
   determining, responsive to determining that the wireless link is subsequently reconnected, the link state information based on a signal strength of a signal used for receiving the beacon frame, and
   send, responsive to determining that the wireless link is subsequently reconnected, the link state information from the link layer to a transport layer; and a transmitter configured to:
   send, to a server using the transport layer, a link notification corresponding to the link state information, wherein the link notification is carried in an extension field of an acknowledgement (ACK) packet, and wherein the extension field comprises a TCP Option included in a TCP header of the ACK packet.

7. The terminal according to claim 6, wherein an acknowledgement number of the ACK packet is a sequence number of a data packet that the terminal expects to receive from the server.

8. The terminal according to claim 6, wherein the link state information comprises one or more types of a signal level, a link quality, and a link bit rate.

* * * * *